United States Patent [19]

Fujiwara et al.

[11] Patent Number: 4,779,538
[45] Date of Patent: Oct. 25, 1988

[54] LEVITATION-PROPULSION MECHANISM FOR INDUCTIVE REPULSION TYPE MAGNETICALLY LEVITATED RAILWAY

[76] Inventors: Shunsuke Fujiwara, No. 14-10, Okusawa 8-chome, Setagaya-ku, Tokyo; Junji Fujie, No. 2-10, Asahiga-oka 2-chome, Hino-shi, Tokyo, both of Japan

[21] Appl. No.: 133,906

[22] Filed: Dec. 16, 1987

[30] Foreign Application Priority Data

Dec. 26, 1986 [JP] Japan .............................. 61-308124
Oct. 19, 1987 [JP] Japan .............................. 62-261820

[51] Int. Cl.$^4$ ............................................. B60L 13/10
[52] U.S. Cl. ................................. 104/282; 104/286; 104/292; 104/294
[58] Field of Search ............... 104/281, 282, 286, 288, 104/290, 291, 292, 293, 294; 318/135

[56] References Cited

U.S. PATENT DOCUMENTS 3,470,828 10/1969 Powell et al. ................. 104/281
3,820,470 6/1974 Karch et al. ................. 104/293
3,858,522 1/1975 Maki ................. 104/292

Primary Examiner—Robert B. Reeves
Assistant Examiner—Joseph D. Pape
Attorney, Agent, or Firm—Wenderoth, Lind and Ponack

[57] ABSTRACT

A levitation-propulsion mechanism for an inductive repulsion type magnetically levitated railway having a vehicle with a truck and a track with a U-shaped cross-section with spaced opposed walls between which the truck runs, has a plurality of vertically positioned superconducting coils on both sides of the truck at intervals therealong in the direction of travel of the vehicle. Guidance coils are mounted on the inside surfaces of the walls of the track at intervals therealong in the direction of travel of the vehicle and opposed to the corresponding superconducting coils. Upper and lower levitation coils are positioned adjacent to the guidance conductor coils and opposed to the superconducting coils, the upper and lower coils being symmetrically positioned above and below, respectively, a horizontal line through the center of the guidance coils, and the upper and lower conductor coils are null-flux connected in a closed circuit. The guidance coils can be connected to a propulsion power source, in which case they become propulsion-guidance coils. Alternatively the levitation coils can be connected to the propulsion power source, in which case they become levitation-propulsion coils.

2 Claims, 5 Drawing Sheets

FIG. I
PRIOR ART
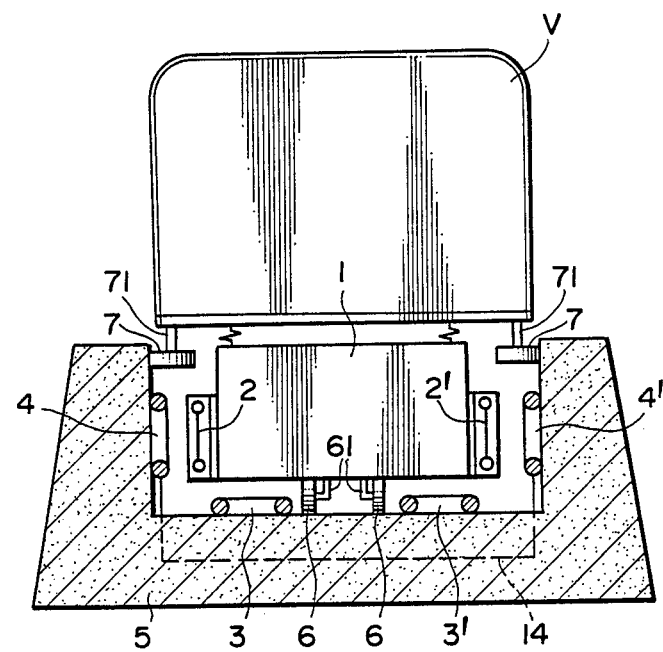

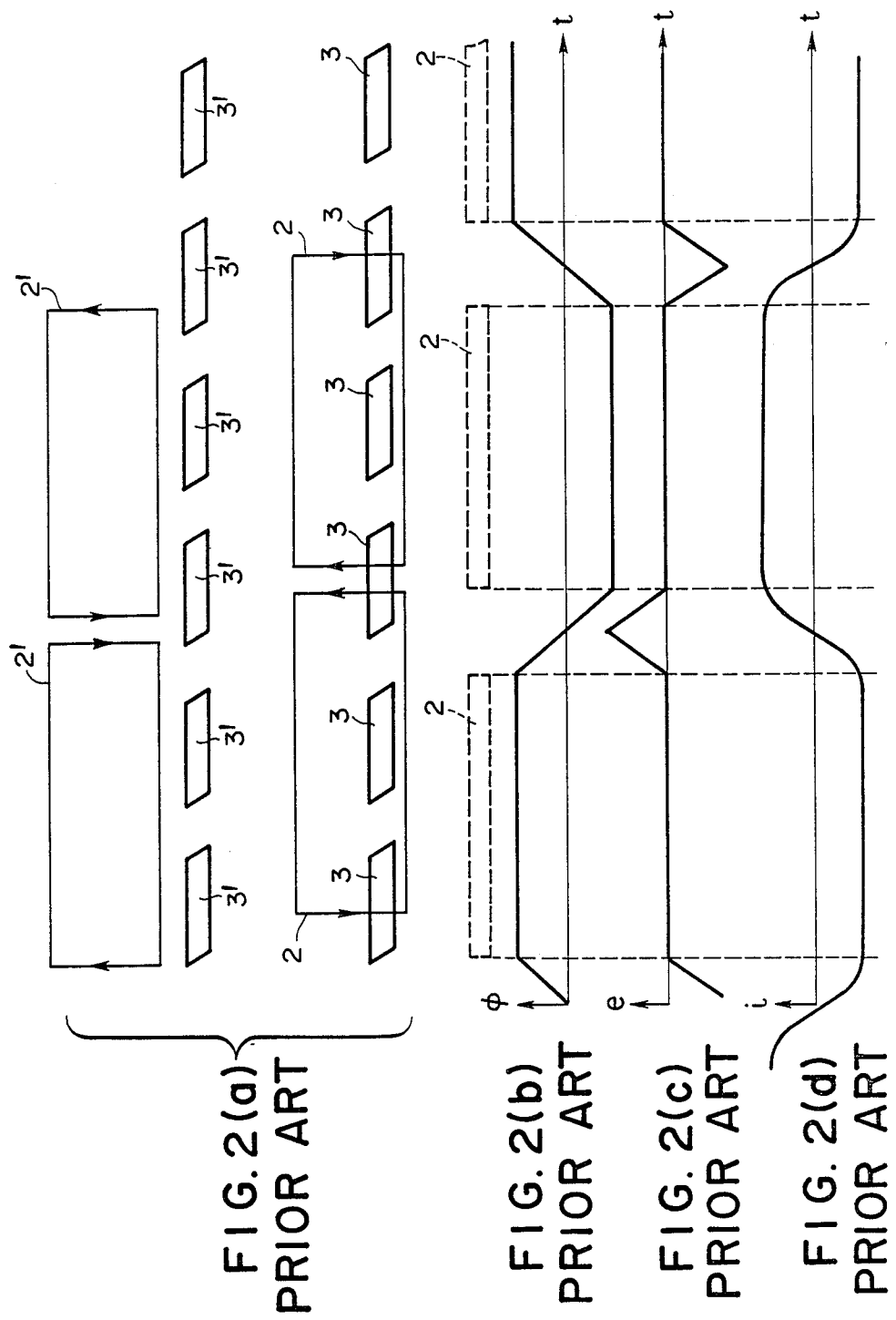

LEVITATION-PROPULSION MECHANISM FOR INDUCTIVE REPULSION TYPE MAGNETICALLY LEVITATED RAILWAY

This invention relates to an inductive repulsion type magnetically levitated railway, and more particularly to a propulsion mechanism therefor.

BACKGROUND OF THE INVENTION

Inductive repulsion type magnetically levitated railways in general are known.

An example of a levitation-propulsion-guidance mechanism for such a railway is shown in FIGS. 1-4. Superconducting coils 2 and 2' are vertically mounted on both sides of the truck 1 of the vehicle V. Conductor coils 3 and 3' for levitation of the vehicle are constituted by conductor-loop coils or conductor-sheets arranged horizontally on the bottom surface of the track 5 having a U-shaped section, and they extend continuously in the direction the vehicle travels on the track 5. The arrangement is as illustrated in FIGS. 2(a)-2(e). Vertically positioned conductor coils 4 and 4' for both guidance and propulsion of the vehicle extend continuously along both sides of the track in the direction of travel of the vehicle at intervals such that they can magnetically couple with said conductor coils 2 and 2' installed on the truck 1.

The vehicle V is levitated by means of said conductor coils 3 and 3' and said superconducting coils 2 and 2' and is propelled and guided by means of said conductor coils 4 and 4' and said superconducting coils 2 and 2'.

The above relationship is shown in detail in FIGS. 2(a)-4.

FIG. 2(a) shows schematically the known superconducting coils 2 and 2' of loop form which are vertically mounted at definite intervals on both sides of the truck 1 in the direction of travel of the train. Usually the adjacent superconducting coils possess mutually opposite polarities.

On the other hand, at the bottom of the track are the conductors 3 and 3' consisting of conductor-loop coils or conductor-sheets which are arranged continuously and which extend horizontally in the direction of travel of the vehicle with gaps such that magnetic induction can take place between the conductor coils 2 and 2' and said conductors 3 and 3'.

Even with this arrangement of these conductors, however, there will never be any magnetic interaction between said superconducting coils 2 and 2' on the vehicle and the conductor coils 3 and 3' on the ground as long as the vehicle is at rest. In such a condition, the vehicle is supported on wheels 6. The vehicle V is driven by means of a known linear motor, consisting of the superconducting coils 2 and 2' mounted on the vehicle and the conductor coils 4 and 4' installed on the track for propulsion and guidance. Thus the superconducting coils 2 and 2' move along the conductor coils 3 and 3' continuously set at definite intervals along the track 5 in the direction of travel of the vehicle, and thereby a current is induced in the conductor coils 3 and 3' by the superconducting coils 2 and 2'. The induced current grows with an increase in the vehicle speed and at a certain speed, say, about 200 Km/h, the conductor coils are nearly saturated. Said current is held at the same level as long as the vehicle runs at this speed or faster. Then in the conductor coils 3 and 3' there develops a linkage magnetic flux as depicted in FIG. 2(b) positionally corresponding to said coils, while at the same time a voltage e for levitation of the vehicle is induced as depicted in FIG. 2(c) positionally correspondingly similarly, whereupon a current as depicted in FIG. 2(d) flows.

When the current in the superconducting coil 2 flows as indicated in FIG. 2(e), the current induced in the conductor coil 3 by the above-mentioned current will flow as indicated in FIG. 2(e). In consequence, according to Fleming's left hand law, the levitating force F will be equal to B×i, where B is the density of the magnetic flux generated by the superconducting coils 2 and 2' and i is the current flowing in the conductor coils 3 and 3'. Thus the vehicle V is levitated by the repulsing force acting between the currents induced in the conductor coils 3 and 3' and in the superconducting coils 2 and 2'.

The guidance and propulsion of the vehicle V are accomplished as follows.

The cross-sectional areas of the conductor coils 4 and 4' are made equal and the spacing between the superconducting coils and the conductor coils 2 and 4 and 2' and 4' are also made equal. As indicated in FIG. 4, the conductor coils 4 and 4' are null-flux connected. If linkage magnetic fluxes $\phi g$ and $\phi g'$ develop in the respective conductor coils 4 and 4' due to the opposed superconducting coils 2 and 2' while the vehicle is running, then if there is no displacement of the vehicle in either direction, $\phi g = \phi g'$ and accordingly the developed linkage magnetic flux for a set of coils will be $\phi g - \phi g' = 0$ and no current will be induced, which means no generation of a guiding force occurs. In contrast, if there is any displacement of the vehicle in either direction, $\phi g > \phi g'$ (the vehicle moves rightward) or $\phi g < \phi g'$ (the vehicle moves leftward) and then the developed linkage magnetic flux for a set of coils will be $\phi g - \phi g' = \pm \Delta \phi g'$, and then the current flows in the conductor coils 4 and 4' as indicated by the solid arrow in FIG. 4, and a guiding force proportional to this displacement in a direction nullifying said displacement will be generated from repulsion between the left side superconducting coil 2 and conductor coil 4 and attraction between the right side superconducting coil 2' and conductor coil 4'.

Meanwhile, as indicated in FIG. 4 a power source 41 of three or poly phases for propulsion of the vehicle is connected to the conductor coils 4 and 4' for both propulsion and guidance of the vehicle. Since said power source provides a current in the flow direction indicated by the dotted arrow to the conductors 4 and 4' for both propulsion and guidance, a propelling force to move the vehicle V occurs in accordance with Fleming's left hand law.

In this system powering, coasting, braking and stopping of the vehicle is effected by controlling the current supplied from a power source 41 to the conductor coils 4 and 4' for both propulsion and guidance.

When the vehicle begins to move driven by the propulsion force generated by the conductor coils 4 and 4' for both propulsion and guidance, levitating force is generated through interaction between the superconducting coils 2 and 2' and the conductor ooils 3 and 3', while a guiding force is generated through interaction between the superconducting coils 2 and 2' and the conductor coils 4 and 4'. After the vehicle attains a certain level of speed, the vehicle is levitated and guided while a constant state of levitation is maintained, thereby allowing the wheels 6 to be raised. When the speed becomes lower than said certain level, the levitation force drops and is gradually lost, and the vehicle must be supported on the ground track 5 by means of the auxiliary support such as the wheels 6. In FIG. 1, a mechanical guide wheel 7 is rotatably mounted on the end of each of shafts 71 the other end of which is fixed to the vehicle, said wheels rolling along the respective sides of the track 5 and serving to guide the vehicle. Shafts 61 are fixed to the truck 1 at one end and have the respective wheels 6 rotatably mounted on the other ends thereof.

In this inductive repulsion type magnetically levitated railway in which the conductor coils 3 and 3' for levitation on the ground are located on the track 5 in a horizontal position and the superconducting coils 2 and 2' on the vehicle are vertically mounted on the sides of the truck facing in the lateral direction, a large induced current must be passed through the conductor coils 3 and 3' for levitation in order to generate an effective levitating force between the superconducting coils and the conductor coils. Thus Joule losses suffered in the conductor coils 3 and 3' grow large because of the large current induced in the conductor coils 3 and 3' and there is a limit to how much the running resistance can be decreased.

In addition, the conductor coils 4 and 4' on the sides of the track and which serve for both propulsion and guidance of the vehicle have a power source for propulsion connected thereto and these coils have a high voltage impressed thereon. The null-flux cable 14 connecting the right and left conductor coils 4 and 4' must therefore be designed such as to be able to withstand a high voltage, which results in complexity of structure and high cost of the cable. In order to avoid imposing such a high voltage on the null-flux cable 14, it is possible to provide separate coils for propulsion and for guidance, but this will result in an increased number of coils.

OBJECTS AND BRIEF SUMMARY OF THE INVENTION

The primary object of the invention is to provide a new inductive repulsion type magnetically levitated railway having a minimum running resistance of the vehicle, therefore consuming less energy for running than the conventional railway, and having an extremely simplified structure of vehicle and track as compared with the conventional railway and with no design restrictions on the vehicle bottom because of the absence of the ground coils on the track below the vehicle. Another object of the invention is to make it possible to use the conductor for levitation for propulsion as well.

To this end, the present invention provides an induction repulsion type magnetically levitated railway structure in which the superconducting coils are mounted vertically on both sides of the truck of the vehicle, the conductor coils for both propulsion and guidance which are opposed to side superconducting coils continuously arranged at definite intervals on both walls of the U-section track in the direction of travel of the vehicle, and the power source for propulsion is connected to these conductor coils. Beside the superconducting coil adjoining the conductor coil for both propulsion and guidance in vertically symmetric positions with respect to a specific point of a horizontal line passing through the center of the conductor coiss for both propulsion and guidance there are provided upper and lower conductor coils for levitation and these conductor coils are null-flux connected. In addition, the power source for propulsion is connected to said conductor coil for levitation instead of to said conductor coils serving for both propulsion and guidance so that said conductor for levitation can serve as the conductor for both levitation and propulsion, thereby making it possible to use a low-voltage null-flux cable and low-voltage conductor coils for guidance.

Other objects, features and advantages of the present invention will become more apparent from the following detailed description made in conjunction with the attached drawings.

BRIEF DESCRIPTION OF THE DRAWINGS

FIG. 1 is a partial sectional elevation view of one example of a conventional inductive repulsion type magnetically levitated railway;

FIG. 2(a) is a diagrammatic view showing the relationship between the superconducting coils on the vehicle and the ground mounted conductor coils for levitation of the inductive repulsion type magnetically levitated railway illustrated in FIG. 1;

FIG. 2(b) is a diagram showing the linkage magnetic flux induced in the conductor coils for levitation in FIG. 2(a);

FIG. 2(c) is a diagram showing the voltage developed by the magnetic flux in FIG. 2(b);

FIG. 2(d) is a diagram showing the current generated by the voltage in FIG. 2(c);

DETAILED DESCRIPTION OF THE INVENTION

As shown in FIGS. 1–4, in the conventional inductive repulsion type magnetically levitated railway, the vehicle-levitating force is generated by the conductor coils 3 for levitation which are on the ground, and the arrangement of the superconducting coils on the vehicle and the conductor coils 3 for levitation which are on the ground is as illustrated in FIG. 1, and accordingly a large current must be induced in the conductor coils 3 for levitation, and the possibility of reducing the running resistance is limited. Meanwhile, an unstable spring force in the lateral direction is generated from the conductor coils 3 for levitation and it is necessary to generate a stable spring force surpassing said unstable spring force by means of the conductor coils serving for both propulsion and guidance.

Figure 2E:
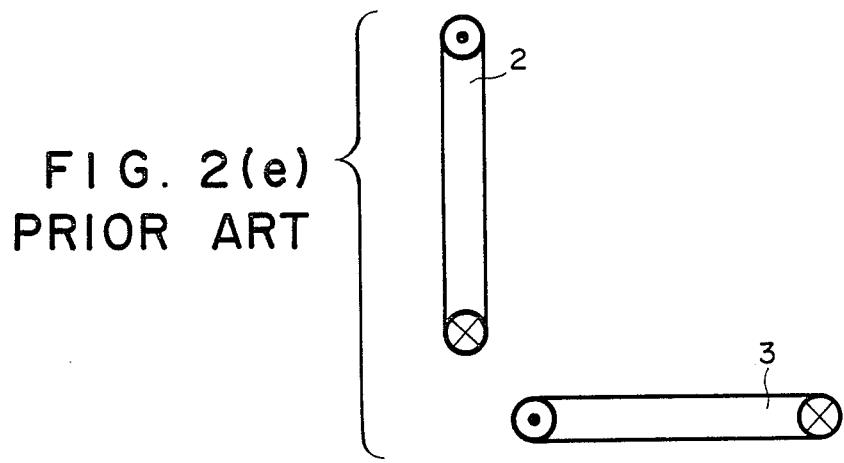
FIG. 2(e) is a schematic sectional view showing the direction of the current induced between the superconducting coil on the vehicle and the conductor coil for levitation on the ground in the railway of FIG. 1.
Figure 3:
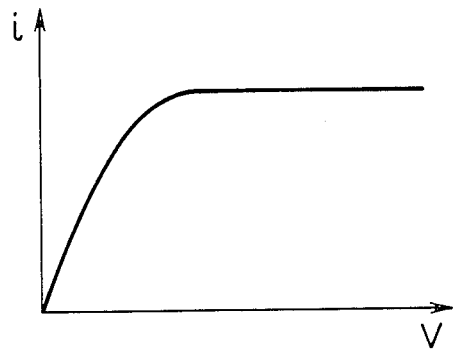
FIG. 3 is a diagram showing the relation between the running speed and induced current of an inductive repulsion type magnetically levitated vehicle.
Figure 4:
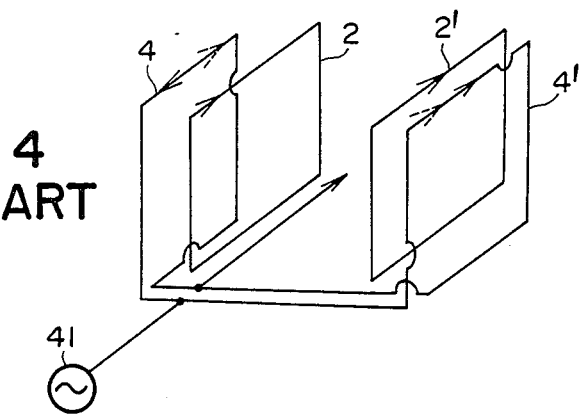
FIG. 4 is a circuit diagram showing the electrical wiring of the superconducting coil on the vehicle and the conductor coil for both guidance and propulsion on the ground in the railway of FIG. 1.
Figure 5:
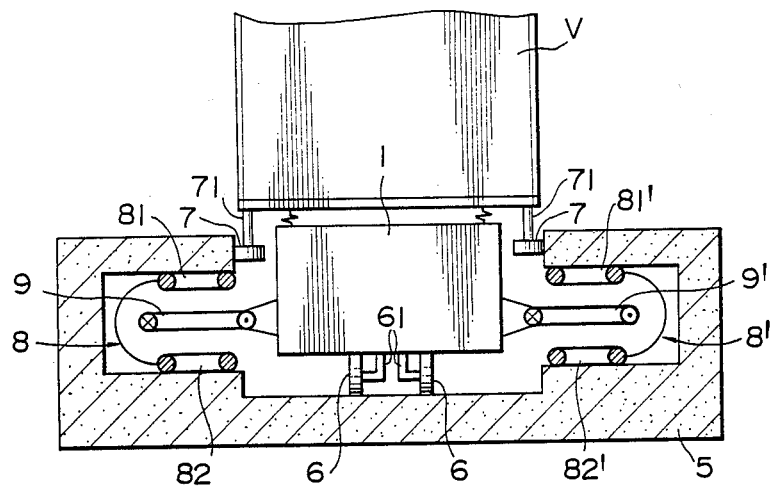
FIG. 5 is a sectional view illustrating a known arrangement and electrical wiring of the superconducting coil on the vehicle and the conductor coil on the ground which are designed to decrease the running resistance of an inductive repulsion type magnetically levitated vehicle.

A structure as illustrated in FIG. 5 has been proposed as one means of reducing the running resistance of the vehicle.

In FIG. 5, the identical reference numbers are used as are used in FIG. 1-4 to represent the same elements. On both sides of the truck 1 of the vehicle V, extending horizontally and laterally symmetrically with respect to the center of the truck 1 there are installed superconducting coils 9 and 9'. On track surfaces above and below said conducting coils 9 and 9' are also horizontally mounted conductor coils 81, 82, 81' and 82' of same dimensions, which are respectively null-flux connected. The thus constituted conductors 8 for levitation are continuously laid out at definite intervals along the track 5.

With this arrangement the levitating force is generated by the conductors 81, 82 and 81', 82'. When the superconducting coils 9 and 9' are at a mid-height between the conductors 81 and 82 and 81' and 82', the linkage magnetic flux in the conductor 8 for levitation will be zero and the magnetic running resistance will be zero. When said superconducting coils 9 and 9' on the vehicle are displaced upward or downward, a force will appear which acts to bring these coils back to said mid-height. However, in this system when said superconducting coils 9 and 9' shift in the lateral direction, said conductor coils 8 and 8' on the right and on the left of the truck 1 will generate an unstable force in a direction tending to increase the displacement. Thus, the system illustrated in FIG. 5 cannot be used unless it is modified by the addition of a separate guidance mechanism, and is therefore disadvantageous on account of the structural complexity of the vehicle and the track.

Figure 6:
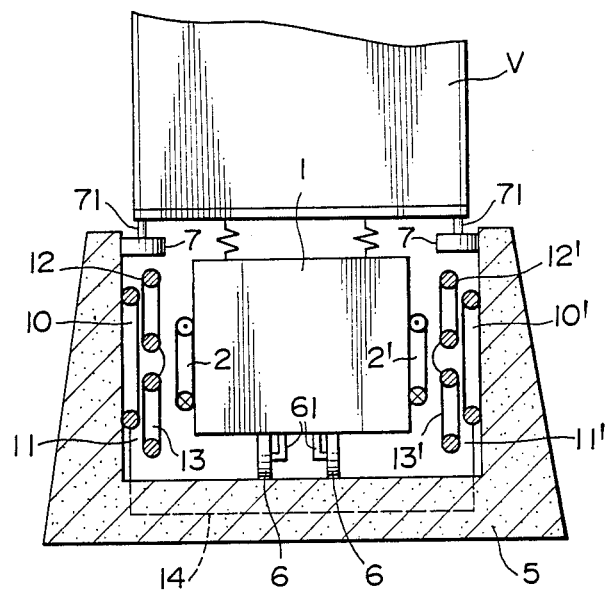
FIG. 6 is a partial sectional elevation view of one embodiment of the railway of the present invention.
Figure 7:
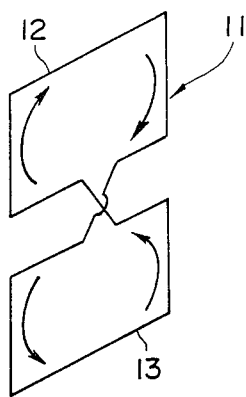
FIG. 7 is a circuit diagram showing the electrical wiring of the conductor for levitation in the railway of FIG. 6 and the direction of flow of the induced current therein.

The present invention as illustrated in FIGS. 6 and 7 avoids these disadvantages.

In FIGS. 6 and 7, the same reference numerals are used as in FIGS. 1-4 to designate the same elements. Superconducting coils 2 and 2' are vertically mounted on both sides of the truck 1 of the vehicle. Conductor coils 10 for both guidance and propulsion are vertically mounted on the inside surfaces of the walls of the track 5 in positions opposed to said superconducting coils 2. Also opposed to said superconducting coils 2 and 2' and over said guidance and propulsion conductor coils 10 and 10' are vertically mounted levitation conductors 11. The levitation conductors 11 each consist of conductor coil 12 and conductor coil 13 of the same shape and same size and positioned symmetrically above and below a horizontal line passing through the middle of conductor coils 10 and 10' and null-flux connected as shown in FIG. 7. When the vehicle V is moving slowly on the wheels 6, the coils are positioned such that the vertical midpoint of the superconducting coils 2 and 2', the vertical midpoint of the levitating conductors 11 and 11' and the vertical midpoint of the propulsion and guidance conductors 10 and 10' are on said horizontal line. The conductor coils 12 and 13 and 12' and 13' are vertically symmetrically positioned about the vertical midpoint of said levitation conductors 11 and 11'.

With this arrangement, when the vertical midpoint of the superconducting coils 2 and 2' and the vertical midpoint of the propulsion and guidance conductor coils 10 and 10' are at the same height, in other words when the running speed of the vehicle is low, the upper and lower conductor coils 12 and 12' and 13 and 13' of the levitation conductors 11 and 11' are also in a symmetrical position about the vertical midpoint of the same height.

Accordingly the net linkage magnetic flux developed in the levitation conductors 11 and 11' is zero and the current is zero, which means that the magnetic running resistance is zero. When the vehicle V is in a levitated run with the wheels drawn up, the vertical midpoint of the superconducting coils 2 and 2' settles somewhat below the vertical midpoint of the conductor coils 10 and 10', and the superconducting coils 2 and 2' cause currents to be induced in opposite directions in the levitation conductor coils 12 and 12' and 13 and 13', as indicated in FIG. 7, whereby a levitating force develops, but because the levitation conductor coils 12 and 13 and 12' and 13' are null-flux connected, the magnetic running resistance is reduced.

In the above embodiment, the levitation conductors 11 and 11' are vertically positioned and opposed to the superconducting coils just as are the propulsion and guidance conductor coils 10 and 10'. As a consequence, a stable spring force in lateral direction develops, unlike in the prior art device shown in FIG. 5. The lateral spring force originating from the propulsion and guidance conductor coils 10 and 10' is small. Thus the spacing between the superconducting coils 2 and 2' mounted on the truck 1 and the propulsion and guidance conductor coils 10 and 10' can be made large, which permits the propulsion and guidance conductor coils 10 and 10' and levitation conductors 11 and 11' to be located adjacent to each other as shown in FIG. 6. There is no need for installation of the conductor coils on the track base so that there is no restriction imposed on the clearance of the truck bottom above the track base, which is a considerable advantage in the manufacture of the vehicle.

As for the function of the propulsion and guidance conductor coils 10 and 10' as shown in FIG. 6, they operate on the same principle of propulsion and guidance as the corresponding coils in the prior art system as illustrated in FIG. 1.

Thus in the embodiment illustrated in FIGS. 6 and 7 the running resistance of the vehicle can be reduced. Therefore the energy consumption can be remarkably reduced as compared with the conventional inductive repulsion type magnetically levitated vehicle, and the structures of the vehicle and track can be simplified.

However, in the embodiment of FIG. 6, a null-flux cable 14 is provided for connecting the right and left propulsion and guidance conductor coils 10 and 10', and this should be connected to the power source for propulsion, so that said conductor coils 10 and 10' must be designed to withstand high voltage.

To make it possible to use a low voltage null-flux cable, a separate installation of the propulsion and guidance conductor coils may be considered, but then an increased number of conductor coils would be required, complicating the structure.

Figure 8:
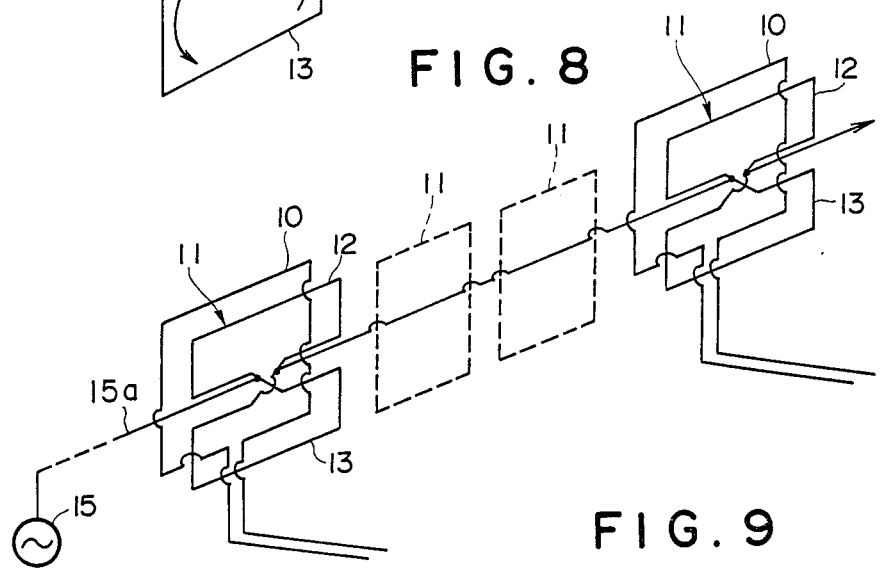
FIG. 8 is a circuit diagram of one embodiment of the conductor for levitation serving concurrently for levitation and for propulsion for the railway of FIG. 6.
Figure 9:
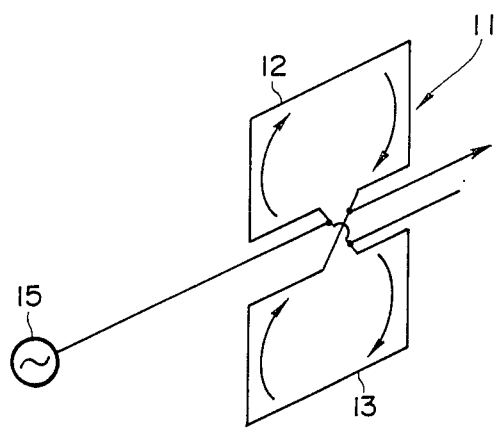
FIG. 9 is a circuit diagram showing the direction of flow of the propulsion current of the conductor serving concurrently for levitation and for propulsion in the embodiment illustrated in FIG. 8.

FIGS. 8 and 9 show a second embodiment which overcomes the above-mentioned problems inherent in the embodiment of FIGS. 6 and 7.

In the second embodiment, the conductors 11 corresponding to the levitation conductors in FIGS. 6 and 7 are connected to the power source 15 for propulsion power by a power line 15a, as shown in FIG. 8. FIG. 8 shows the layout of the conductor coil 10 and the conductor 11 for one side wall of the track 5 shown in FIG. 6. For the other side wall, the conductor coil 10' and the conductor 11' are symmetrically laid out. In FIG. 8 the three phase or polyphase propulsion power source 15 is connected not to the conductor coil 10 but to the conductor 11. When a three phase propulsion power source is used as the power source, the respective phases of the said power source are connected to every third conductor 11.

Even when the conductors 11 are electrically connected as shown in FIG. 8, the levitating function will be performed in just the same way as in the embodiment of FIGS. 6 and 7, and the vehicle can make a levitated run with magnetically small running resistance. In this case the induced levitation currents will flow in the loop conductors 11 in the directions as indicated by the arrows in FIG. 7, and will be in opposite directions in the upper and lower conductor coils 12 and 13, thereby generating a levitating force. In addition, the propulsion current flows through coils 11 and 12 from the power source 15, and as indicated in FIG. 9, the flow direction is the same for the upper and lower conductor coils 12 and 13, thereby generating a propelling force in the direction of travel of the vehicle. In other words, the conductor 11 alone can concurrently serve for both propulsion and levitation and is a propulsion-levitation conductor. With this arrangement there is no need to connect the conductor coils 10 and 10', which in this embodiment are just guidance conductor coils, to the power source for propulsion, and therefore a low voltage null-flux cable 14 and low voltage conductor coils 10 and 10' suffice for these coils.

The major effects derived from the present invention can be summarized as follows:

(1) In the conventional inductive repulsion type magnetically levitated railway, the conductor coils for generating the levitating force are, as illustrated in FIG. 1, laid out horizontally on the track base, while the superconducting coils are vertically mounted on both sides of the truck 1. In this arrangement a large induced current must be passed through the levitation conductor coils 3 and 3', thus setting a limit to the possibility of reducing the running resistance. In addition, there is a problem of an unstable spring force in the lateral direction developing from the levitation conductor coils 3 and 3'. According to the present invention, however, in which the levitation conductors as shown at 11 in FIG. 6 are provided, the magnetic running resistance during low-speed running of the vehicle on the wheels can be made zero, and even during levitated running of the vehicle, said magnetic running resistance can be minimized, thereby greatly reducing the energy consumption for running as compared with the conventional inductive repulsion type magnetically levitated railway. Moreover, because a laterally stable spring force is developed at the same time from the levitation conductor 11, there is no drawback due to a lateral unstable spring force as in the conventional inductive repulsion magnetically levitated railway. In consequence, the lateral spring force generated from the propulsion and guidance conductor coils 10 and 10' can be reduced.

(2) According to the present invention, there is no need to provide conductor coils on the track base, and in consequence there is no need to pay appropriate attention to the design precision of such coils at the time of manufacture, and there is no restriction imposed on the clearance of the truck bottom from the track base, which greatly simplifies the structure.

(3) By connecting the propulsion power source to the levitation conductor 11 it becomes possible to make the conductor 11 which is normally for levitation alone serve concurrently for both propulsion and levitation. This obviates the need to connect the propulsion power source to the conductor coils 10 and 10' which will now serve only as guidance coils and in consequence a low voltage null-flux cable 14 and a low voltage conductor coils can be used for the guidance coils 10 and 10'. The null-flux cable can be embedded in the track 5. Thus all the design and construction considerations required in the conventional inductive repulsion magneically levitated railway for making the null-flux cable able to withstand high voltage are unnecessary.

What is claimed is:

1. A levitation-propulsion mechanism for an inductive repulsion type magnetically levitated railway having a vehicle with a truck and a track with a U-shaped cross-section with spaced opposed walls between which said truck runs, comprising:

a plurality of vertically positioned superconducting coils on both sides of said truck at intervals therealong in the direction of travel of the vehicle;

propulsion-guidance coils mounted on the inside surfaces of the walls of said track at intervals therealong in the direction of travel of the vehicle and opposed to the corresponding superconducting coils;

a propulsion power source;

said propulsion-guidance conductor coils opposite each other on opposite sides of said track being null-flux connected and connected to said propulsion power source; and upper and lower levitation coils adjacent to said propulsion-guidance conductor coils and opposed to said superconducting coils, said upper and lower coils being symmetrically positioned above and below, respectively, a horizontal line through the center of said propulsion-guidance coils, and said upper and lower conductor coils being null-flux connected in a closed circuit.

2. A levitation-propulsion mechanism for an inductive repulsion type magnetically levitated railway having a vehicle with a truck and a track with a U-shaped cross-section with spaced opposed walls between which said truck runs, comprising:

a plurality of vertically positioned superconducting coils on both sides of said truck at intervals therealong in the direction of travel of the vehicle;

guidance coils mounted on the inside surfaces of the walls of said track at intervals therealong in the direction of travel of the vehicle and opposed to the corresponding superconducting coils, said guidance conductor coils opposite each other on opposite sides of said track being null-flux connected;

a propulsion power source;

upper and lower propulsion-levitation conductor coils adjacent to said guidance conductor coils and opposed to said superconducting coils, said upper and lower propulsion-levitation conductor coils being symmetrically positioned above and below, respectively, a horizontal line through the center of said guidance coils, and said upper and lower propulsion-levitation conductor coils being null-flux connected in a closed circuit and further being connected to said power source for having current flow in the same direction therein for propulsion.

* * * * *